US012732310B2

(12) United States Patent
Liu et al.

(10) Patent No.: US 12,732,310 B2
(45) Date of Patent: Sep. 8, 2026

(54) HARQ ACK FEEDBACK FOR SIDELINK COMMUNICATIONS

(71) Applicant: Nokia Technologies Oy, Espoo (FI)

(72) Inventors: Jianguo Liu, Shanghai (CN); Yong Liu, Shanghai (CN); Tao Tao, Shanghai (CN); Yan Meng, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 326 days.

(21) Appl. No.: 18/564,092

(22) PCT Filed: May 26, 2021

(86) PCT No.: PCT/CN2021/096140
§ 371 (c)(1),
(2) Date: Nov. 26, 2023

(87) PCT Pub. No.: WO2022/246706
PCT Pub. Date: Dec. 1, 2022

(65) Prior Publication Data
US 2024/0250781 A1 Jul. 25, 2024

(51) Int. Cl.
*H04L 1/18* (2023.01)
*H04L 1/1829* (2023.01)
(Continued)

(52) U.S. Cl.
CPC .......... *H04L 1/1854* (2013.01); *H04L 1/1861* (2013.01); *H04L 1/1864* (2013.01); *H04L 5/0055* (2013.01); *H04W 72/25* (2023.01)

(58) Field of Classification Search
CPC ............................. H04W 72/25; H04L 5/0055
See application file for complete search history.

(56) References Cited

U.S. PATENT DOCUMENTS 11,539,475 B2 * 12/2022 Park ...................... H04L 1/1864
12,232,090 B2 * 2/2025 Lee ........................ H04W 4/40
(Continued)

FOREIGN PATENT DOCUMENTS

CN 111866800 A 10/2020
CN 112740594 A 4/2021
(Continued)

OTHER PUBLICATIONS

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.
(Continued)

*Primary Examiner* — Shukri Taha
(74) *Attorney, Agent, or Firm* — Carter, DeLuca & Farrell LLP

(57) ABSTRACT

Example embodiments of the present disclosure relate to devices, methods, apparatuses and computer readable storage media for hybrid automatic repeat request acknowledgement (HARQ ACK) feedback for sidelink communications. In example embodiments, a first device determines a time window to be used by a second device to transmit HARQ ACK feedback for sidelink transmission from the first device to the second device. Then, the first device transmits an indication of the time window to the second device. Further, the first device monitors the HARQ ACK feedback from the second device within the time window.

16 Claims, 5 Drawing Sheets

(51) Int. Cl.
*H04L 5/00* (2006.01)
*H04W 72/25* (2023.01)

(56) References Cited

U.S. PATENT DOCUMENTS

| | | | | |
|---|---|---|---|---|
| 2020/0029318 | A1 | 1/2020 | Guo | |
| 2020/0228247 | A1* | 7/2020 | Guo | H04L 1/0025 |
| 2020/0295883 | A1 | 9/2020 | Lee et al. | |
| 2021/0007081 | A1 | 1/2021 | Shin et al. | |
| 2021/0028891 | A1 | 1/2021 | Zhou et al. | |
| 2021/0045100 | A1 | 2/2021 | Park | |
| 2021/0105661 | A1 | 4/2021 | Baghel et al. | |
| 2024/0057125 | A1* | 2/2024 | Park | H04L 1/1812 |

FOREIGN PATENT DOCUMENTS

| | | | | |
|---|---|---|---|---|
| WO | 2016/161579 | A1 | 10/2016 | |
| WO | 20201/46580 | A1 | 7/2020 | |
| WO | WO-2021015577 | A1 * | 1/2021 | H04W 72/23 |
| WO | 2021/063405 | A1 | 4/2021 | |

OTHER PUBLICATIONS

"3rd Generation Partnership Project; Technical Specification Group Radio Access Network; NR; Physical layer procedures for data (Release 16)", 3GPP TS 38.214, V16.5.0, Mar. 2021, pp. 1-171.

"3rd Generation Partnership Project; Technical Specification Group Radio Access Network; NR; Multiplexing and channel coding (Release 16)", 3GPP TS 38.212, V16.5.0, Mar. 2021, pp. 1-152.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300 V16.5.0, Mar. 2021, pp. 1-391.

"3rd Generation Partnership Project; Technical Specification Group Radio Access Network; NR; NR and NG-RAN Overall Description; Stage 2 (Release 16)", 3GPP TS 38.300, V16.5.0, Mar. 2021, pp. 1-151.

IEEE 802.11, Wikipedia, Retrieved on Mar. 11, 2024, Webpage available at : https://en.wikipedia.org/wiki/IEEE_802.11.

"3rd Generation Partnership Project; Technical Specification Group Radio Access Network; Physical layer procedures for shared spectrum channel access (Release 16)", 3GPP TS 37.213, V16.5.0, Mar. 2021, pp. 1-27.

"5 GHz RLAN; Harmonised Standard covering the essential requirements of article 3.2 of Directive 2014/53/EU", ETSI EN 301 893, V2.1.1, May 2017, pp. 1-122.

"The 5G Evolution: 3GPP Releases 16 and 17", GSMA Intelligence, Mar. 1, 2018, 54 pages.

International Search Report and Written Opinion received for corresponding Patent Cooperation Treaty Application No. PCT/CN2021/096140, dated Mar. 1, 2022, 9 pages.

"Consideration on physical layer procedures", 3GPP TSG RAN WG1 Meeting #95, R1-1813075, Agenda Item: 7.2.4.1.2, Spreadtrum Communications, Nov. 12-16, 2018, 5 pages.

* cited by examiner

HARQ ACK FEEDBACK FOR SIDELINK COMMUNICATIONS

RELATED APPLICATION

This application was originally filed as PCT Application No. PCT/CN2021/096140, filed on May 26, 2021, of which is incorporated herein by reference in its entirety.

FIELD

Example embodiments of the present disclosure generally relate to the field of communications, and in particular, to methods, apparatuses and computer readable storage media for hybrid automatic repeat request acknowledgement (HARQ ACK) feedback for sidelink communications.

BACKGROUND

In telecommunications networks, such as Long Term Evolution (LTE) networks or Next Generation 5G networks, sidelink communications between user equipment (UEs) over a Proximity-Based Service (ProSe) Communication 5 (PC5) wireless interface may be supported. In sidelink communications, UEs may communicate with each other directly via a PC5 wireless interface on a sidelink channel rather than through base station and networks. Further, sidelink communications may obtain a plurality of benefits, such as coverage extension, service reliability enhancement, and potential low latency. Especially, unlicensed technologies may need to abide to the conformance requirement of regulations such as Listen-Before-Talk (LBT) regulation so as to ensure existence fairness with other UEs in the shared unlicensed spectrum. This may mean that, prior to transmission, the transmitting device may perform LBT operation on the unlicensed spectrum. For example, the transmitting device shall sense the channel for sidelink transmission and may start transmission only if the channel is at the idle status. Thus, the transmission and reception of HARQ ACK feedback is also an important issue for sidelink communications in spectrum.

SUMMARY

In general, example embodiments of the present disclosure provide devices, methods, apparatuses and computer readable storage media for HARQ ACK feedback for sidelink communications.

In a first aspect, a first device is provided which comprises at least one processor and at least one memory including computer program code. The at least one memory and the computer program code are configured to, with the at least one processor, cause the first device to determine a time window to be used by a second device to transmit HARQ ACK feedback for sidelink transmission from the first device to the second device. The first device is further caused to transmit an indication of the time window to the second device and monitor the HARQ ACK feedback from the second device within the time window.

In a second aspect, a second device is provided which comprises at least one processor and at least one memory including computer program code. The at least one memory and the computer program code are configured to, with the at least one processor, cause the second device to receive, from a first device, an indication of a time window to be used by the second device to transmit HARQ ACK feedback for sidelink transmission from the first device to the second device. The second device is further caused to transmit, to the first device, the HARQ ACK feedback within the time window.

In a third aspect, a method is provided. In the method, a first device determines a time window to be used by a second device to transmit HARQ ACK feedback for sidelink transmission from the first device to the second device. Then, the first device transmits an indication of the time window to the second device. Further, the first device monitors the HARQ ACK feedback from the second device within the time window.

In a fourth aspect, a method is provided. In the method, a second device receives, from a first device, an indication of a time window to be used by the second device to transmit HARQ ACK feedback for sidelink transmission from the first device to the second device. Then, the second device transmits, to the first device, the HARQ ACK feedback within the time window.

In a fifth aspect, there is provided an apparatus comprising means for performing the method according to the third or fourth aspect.

In a fourth aspect, there is provided a computer readable storage medium comprising program instructions stored thereon. The instructions, when executed by a processor of a device, cause the device to perform the method according to the third or fourth aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
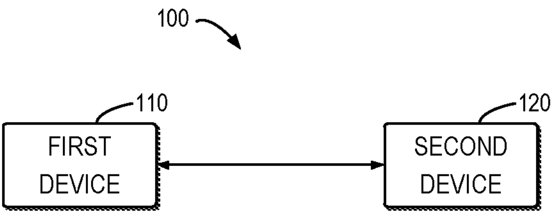
FIG. 1 shows a simplified block diagram of an environment in which embodiments of the present disclosure may be implemented.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" or "user equipment" refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the base station on predetermined schedules, when triggered by an internal or external event, or in response to requests from the network side.

Examples of the UE include, but are not limited to, smart phones, wireless-enabled tablet computers, laptop-embedded equipment (LEE), laptop-mounted equipment (LME), wireless customer-premises equipment (CPE), sensors, metering devices, personal wearable devices such as watches, and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure.

As used herein, the term "circuitry" may refer to one or more or all of the following:

(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular base station, or other computing or base station.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

In telecommunications networks, such as LTE networks or Next Generation 5G networks, sidelink communications between UEs over a PC5 wireless interface may be supported. Respectively, as described in e.g. TS 36.300 for LTE and TS 38.300 for NR, sidelink communications between UEs over PC5 may be based on the principle of direct communication rather than through base station and networks. However, current sidelink solution in 3GPP is only applicable in licensed spectrum, or ITS (Intelligent Transportation System) band. In IEEE 802.11, there is no specification concerning unlicensed sidelink communications for NR.

Recently, sidelink communications in unlicensed spectrum is getting more attention due to a plurality of potential benefits. Stand-alone NR unlicensed spectrum is a key enabler for private network in industrial automation. Unlicensed sidelink communications may provide additional benefits and value-added services in complex industrial scenario. In some challenging conditions with high path loss or strictly regulated transmission power, coverage extension may be obtained. Besides, due to the use of multiple transmission paths, service reliability may be enhanced. Moreover, for the reason that there is direct sidelink transmission without communications with base station and networks, potential low latency may be achieved.

Moreover, a new study item of unlicensed sidelink has been approved by China Communications Standards Association (CCSA). In this new study, the LBT mechanism has been integrated to enable sidelink communications on unlicensed spectrum. The research scope includes the following: 1) Study service requirements, service models and key technical performance indicators of sidelink communications on unlicensed spectrum; 2) Study and design channel access mechanism (LBT) that works on unlicensed spectrum; 3) Study and design physical layer frame structure, parameter set, physical signals and channels which can meet key technical performance indicators of sidelink communications on unlicensed spectrum; 4) Study and design resource allocation mechanisms and physical resource sharing mechanisms for sidelink communications on unlicensed spectrum; 5) Study and design physical layer processes such as HARQ ACK feedback and retransmission mechanism, and power control mechanism for sidelink communications on unlicensed spectrum; 6) Study and design protocol stacks of higher layer user plane and control plane for sidelink communications on unlicensed spectrum; 7) Study and design mechanisms to support joint operation of sidelink communications on licensed and unlicensed spectrum under the control of cellular networks; and 8) The operating frequency range of unlicensed spectrum that this communication technology is expected to support is within FR1 (5-7 GHz) and FR2 (50-70 GHz).

In sidelink communications on unlicensed spectrum, LBT access mechanism may ensure co-existence fairness with other UEs in the shared unlicensed spectrum. It is useful to introduce the access mechanism based on LBT in detail. In Release (Rel)-16, NR-based access to unlicensed spectrum was introduced. NR operation in unlicensed bands relies on a transmitting device sensing the radio resources before commencing transmission, also known as LBT. Different types of LBT procedures are defined for NR-based access to unlicensed spectrum. For New Radio Unlicensed (NR-U) spectrum, the channel access types supported in Rel-16 are summarized in Table 1.

TABLE 1

| LBT Category | LBT Type | Description | LBT measurement duration | Use Case |
|---|---|---|---|---|
| Cat. 1 | Type 2C | Immediate transmission without LBT for a duration of up to 584 us | No LBT, duration of the gap is up to 16 us | UL following DL within a next generation NodeB (gNB)-initiated channel occupancy time (COT), e.g. Physical Uplink Control Channel (PUCCH), or DL following UL in a UE initiated COT (e.g. control) |
| Cat. 2 | Type 2B (16 μs) Type 2A (25 μs) | Single-shot LBT | 16 us or 25 us | Prior to DRS (25 us LBT), or for UL channels within a gNB-initiated channel occupancy, or DL following UL in a UE initiated COT |
| Cat. 4 | Type 1 | LBT with exponential back-off | Channel needs to be sensed to be idle a certain number of times | Initiation of a channel occupancy (by gNB or UE) |

As shown in Table 1, in 3GPP Technical Specification (TS) 37.213, two types of LBT schemes are defined, i.e., Type 1 and Type 2. Type 1 LBT, also known as Category 4 LBT (Cat.4 LBT), is defined as a continuous sensing of the channel activity for, at least, N clear channel assessment (CCA) intervals, where N is a random number obtained from a uniform distribution. Once the channel is declared as idle, a device may access the channel for a maximum time known as the maximum channel occupancy time (MCOT). During that time, the device may grant access to another device and rely on COT sharing. In COT sharing conditions, a device may be allowed to access the channel by performing Type 2 LBT.

As discussed above, for unlicensed spectrum access, the transmission is dependent on the outcome of the LBT check. If there is significant congestion at the transmitter side, then the LBT check will fail and the device will be prevented from accessing the reserved resources for sidelink communication. Upon receiving signals from the transmitting device via a Physical Sidelink Control Channel (PSCCH)/a Physical Sidelink Shared Channel (PSSCH) with HARQ-enabled, the receiving device needs to send the HARQ ACK feedback at the predetermined occasion on the PSFCH to the transmitting device after a decoding process. However, if the LBT procedure fails for the receiving device, the HARQ ACK feedback may be dropped and thus cause the retransmission even if the receiving device receives the transmission correctly. This would cause unnecessary resource waste and latency. Therefore, the transmission and reception of the HARQ ACK feedback is also an important problem to be solved for sidelink communication in unlicensed spectrum.

Embodiments of the present disclosure provide a new scheme of HARQ ACK feedback for sidelink communications. A device (referred to as a first device) determines a time window to be used by a further device (referred to as a second device) to transmit HARQ ACK feedback for sidelink transmission from the first device to the second device. The second device receives the indication of the time window and transmits the HARQ ACK feedback within the time window to the first device. The first device monitors the HARQ ACK feedback from the second device within the time window.

This scheme may facilitate fast HARQ ACK feedback for sidelink transmission if the PSFCH is configured at every N slots (N>1). Besides the opportunity of transmitting the HARQ ACK feedback at the predetermined occasion on the PSFCH conventionally, this scheme may allow for an additional opportunity of transmitting the HARQ ACK feedback within a time window on the PSCCH, PSSCH or PSFCH. Further, uncertainty issue of the HARQ ACK feedback via the PSFCH due to the LBT procedure may be overcame.

FIG. 1 shows an example environment 100 in which example embodiments of the present disclosure can be implemented.

The environment 100, which may be a part of a communication network, comprises a first device 110 and a second device 120 communicating with each other or with other devices via each other.

The first and second devices 110 and 120 may be implemented by any suitable devices in the communication network. In some example embodiments, the first and second devices 110 and 120 may be both implemented by terminal devices or UEs.

It is to be understood that two devices are shown in the environment 100 only for the purpose of illustration, without suggesting any limitation to the scope of the present disclosure. In some example embodiments, the environment 100 may comprise a further device (referred to as a third device) to communicate with the first devices 110 or the second device 120 or both.

The communications in the environment 100 may follow any suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connection (DC), and NR-U technologies.

In the environment 100, the first and second devices 110 and 120 can perform sidelink communications. To illustrate the sidelink communications between the first and second devices 110 and 120 and the HARQ ACK feedback procedure for sidelink communications, it is necessary to discuss some knowledge regarding the channel multiplexing with reference to FIG. 2. It is to be understood that the sidelink communication may be implemented in licensed spectrum or in unlicensed spectrum, without suggesting any limitation to the scope of the present disclosure.

Figure 2:
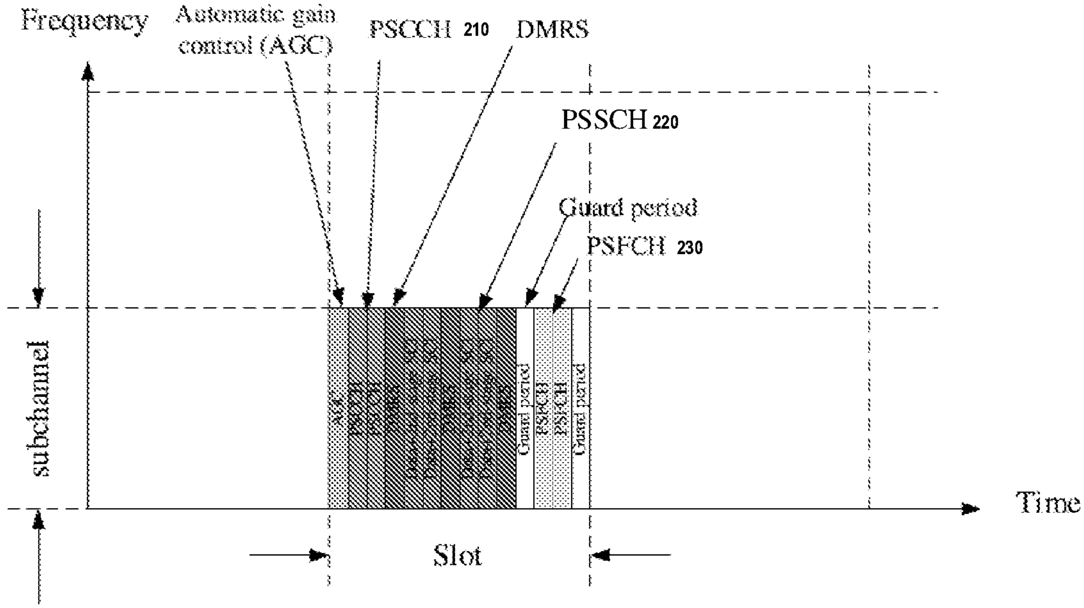
FIG. 2 shows an example of multiplexing of channels for the sidelink communication.

FIG. 2 shows an example of channel multiplexing for the sidelink communication. In this example, a PSCCH 210, a PSSCH 220 and a PSFCH 230 for NR sidelink transmissions are multiplexed.

The PSCCH 210 may be used to carry control information for the sidelink transmission. PSSCH 220 may be used to carry data information for the sidelink transmission. The PSCCH 210 may occupy a number of consecutive RBs in the starting subchannel of the PSSCH 220 transmission over 2 or 3 symbols at the beginning of a slot, while the PSSCH 220 may span over multiple subchannels.

For sidelink communication, Sidelink Control Information (SCI) signalling may be widely used. The first stage of SCI (referred to as $1^{st}$-stage SCI) signalling is conveyed by the PSCCH 210 which may be multiplexed with PSSCH 220 in the time and frequency domains, while the second stage of SCI (referred to as $2^{nd}$-stage SCI) signalling is conveyed by the PSSCH 220 with the QPSK modulation and polar coding. The first stage of SCI signalling mainly carries the information regarding the resources of PSSCH 220 and the information for decoding the second stage of SCI signalling (e.g., time-frequency resources of the PSSCH 220/PSFCH 230, the priority of this transmission block (TB) transmission, etc.), which may be mainly used for channel sensing purpose to be decodable by any device. The second stage of SCI signalling mainly carries the remaining scheduling information for the PSSCH 220 decoding by the target device (e.g., Modulation Coding Scheme (MCS), UE-specific Demodulation Reference Signal (DMRS), New Data Indicator (NDI), Redundancy Version (RV), HARQ process identity, etc.). Both a source identity and a destination identity of a device are carried in the second stage of SCI signalling to reduce the payload size of the first stage of SCI signalling with the cost of the decoding attempts on the two stages of SCI signalling.

The HARQ ACK feedback associated with PSSCH 220 may be conveyed by the PSFCH 230. At every one, two, or four slots, the last two symbols excluding the guard period (GP) symbol are able to accommodate the PSFCH 230. For PSSCH 220 transmission, the HARQ ACK feedback timing is fixed, i.e., the candidate resources of the corresponding PSFCH 230 is associated with the starting subchannel and slot used for that PSSCH 220 for sidelink communication.

In the communication process between the first device 110 and the second device 120, the first device 110 may initiate a sidelink transmission to the second device 120. According to HARQ mechanism, the first device 110 may perform sidelink retransmission if it doesn't receive the HARQ ACK feedback for the corresponding HARQ processes from the second device 120. However, the retransmission may cause resource waste if the second device 120 may decode the transmission correctly. In a conventional process for HARQ ACK feedback, a predetermined occasion on a PSFCH may be used by the second 120 to transmit the HARQ ACK feedback associated with at least one HARQ process for facilitating the communication between the first device 110 and the second device 120. In various example embodiments, a time window may be configured by the first device 110 to facilitate the HARQ ACK feedback for sidelink transmission from the first device 110 to the second device 120, which may benefit latency reduction and transmission efficiency improvement.

Detailed processes for the HARQ ACK feedback will be discussed in the following with reference to FIGS. 3-5.

Figure 3:
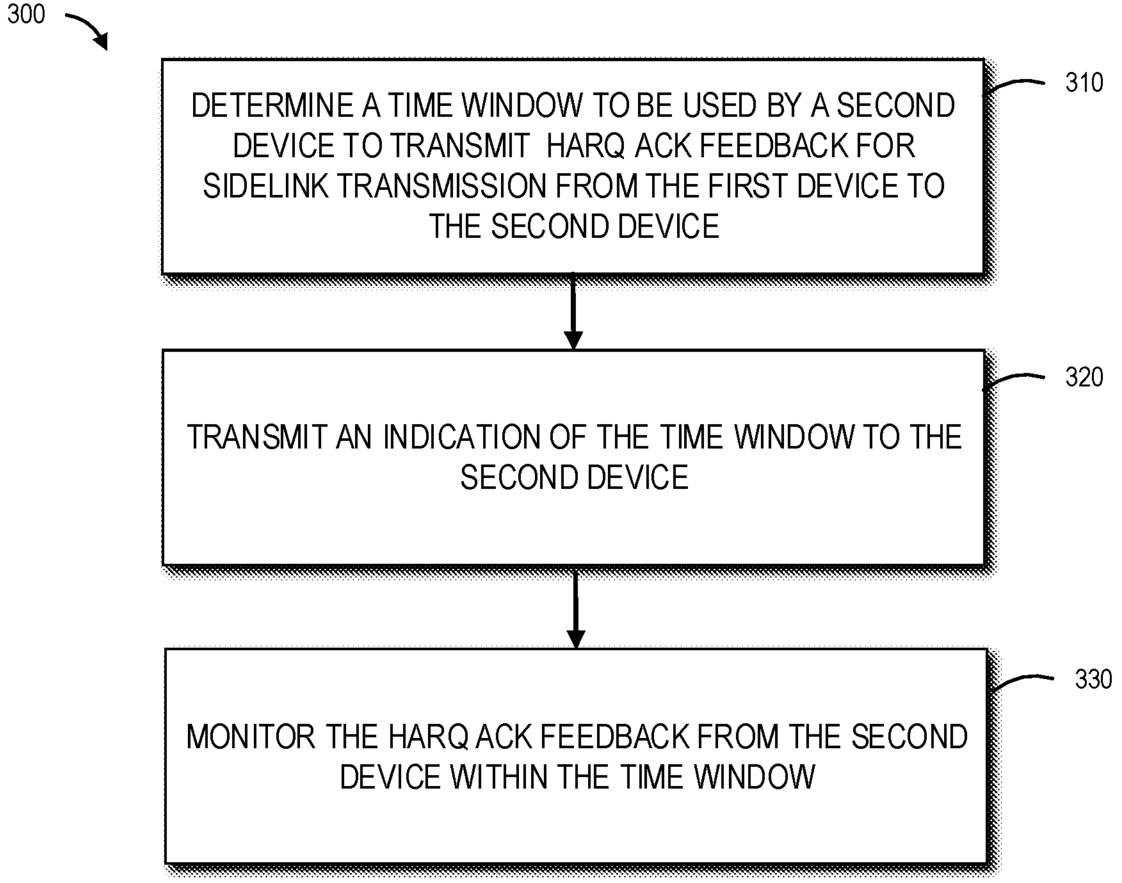
FIG. 3 shows a flowchart of an example method for the first device according to some example embodiments of the present disclosure.

Reference is first made to FIG. 3 which shows flowchart 300 of an example method at the first device 110 according to some example embodiments of the present disclosure. For the purpose of discussion, the method 300 will be described with reference to FIG. 1.

As shown in FIG. 3, at block 310, the first device 110 determines a time window to be used by the second device 120 to transmit HARQ ACK feedback for sidelink transmission from the first device 110 to the second device 120. The time window may be configured by the first device 110 based on any suitable triggering rules or criteria.

In various example embodiments, the predetermined occasion on a PSFCH may be configured in advance for the second device 120 to transmit the HARQ ACK feedback. In some example embodiments, the first device 110 may determine whether to configure the time window based on a length of a time gap (referred to a first time gap) between the sidelink transmission and reception of the HARQ ACK feedback at the predetermined occasion on the PSFCH. As stated above, different types of LBT are enabled for NR-based access to unlicensed spectrum. Based on different LBT types, the PSFCH may be configured to be used for the transmission of the HARQ ACK feedback in different ways. For example, if the first time gap is below a threshold gap (for example, 16 us), there is no need for the first device 110 to configure a time window for the transmission of the HARQ ACK feedback, for the reason that the LBT procedure may not be needed and thus there is no risk of the failure of the transmission of the HARQ ACK feedback at the predetermined occasion on the PSFCH. Otherwise, in some cases where LBT procedure is necessary, the first device 110 may configure the time window. Those skilled in the art may understand that the numeric value of the threshold gap is only for the purpose of illustration, without suggesting any limitation to the scope of the present disclosure.

In some other embodiments, the first device 110 may determine whether to configure the time window based on a length of a time gap (referred to a second time gap) between reception of the HARQ ACK feedback at the predetermined occasion on the PSFCH, and sidelink retransmission from the first device 110 to the second device 120. For example, in some cases, the first time gap may be very large, for example, above a threshold gap. In these cases, in order to reduce the latency, the first device 110 may configure the time window to provide an additional opportunity for the second device 120 to transmit the HARQ ACK feedback before sidelink retransmission. Otherwise, in some other cases, if the second time gap is below a threshold gap, there is no need for the first device 110 to configure a time window for the transmission of the HARQ ACK feedback.

Alternatively or in addition, the first device 110 may determine whether to configure the time window based on the latency requirement for the sidelink transmission. For example, in some cases, it is necessary to ensure that the delayed time required for the sidelink transmission is below a threshold time. In such cases, to meet the latency requirement, the HARQ ACK feedback may be expected to be transmitted as soon as possible. Thus, in such cases, there is a need for the first device 110 to configure a time window for the second device 120 to transmit the HARQ ACK feedback to enable the transmission of the HARQ ACK feedback with low latency. Besides the transmission of the HARQ ACK feedback at the predetermined occasion on the PSFCH, the transmission of the HARQ ACK feedback within the time window on the PSCCH, PSSCH or PSFCH may be enabled to eliminate the impact of the failure of the LBT procedure, which may benefits latency reduction. Moreover, it benefits for some certain PSFCH configurations (for example, where a HARQ ACK feedback corresponds to multiple sidelink transmissions on PSSCH in different slots).

The time window may be configured in any suitable positioning. In some example embodiments, if the first gap is determined to be above a threshold gap, the first device 110 may determine the time window before the predetermined occasion for the reception of the HARQ ACK feedback on the PSFCH. Alternatively or in addition, the time window the predetermined occasion may be determined to be within the time window. In such example embodiments, the HARQ ACK feedback may be transmitted early in case that the HARQ ACK feedback at the predetermined occasion on the PSFCH is blocked due to the failure of the LBT procedure, which may benefit potential latency reduction. In some other example embodiments, the first device 110 may determine the time window within the second time gap. In such example embodiments, an additional opportunity for the second device 120 to transmit the HARQ ACK feedback may be configured and the transmission efficiency improvement may be obtained.

The first device 110 may determine the size of the time window in some suitable way. In some example embodiments, the first device 110 may determine the size of the time window based on the first time gap. In some other embodiments, the first device 110 may determine the size of the time window based on the second time gap. For example the time window may be determined to be the second time gap. In such example, the start point of the time window may be implicitly defined by the predetermined occasion on the PSFCH for the HARQ ACK feedback. The size of the window may be explicitly indicated by the first device 110 to the second device 120. Alternatively or in addition, according to a latency requirement for the sidelink transmission, the first device 110 may determine the size and start point of the time window for the second device 120.

Referring back to FIG. 3, at block 320, the first device 110 transmits an indication of the time window to the second device 120. In some example embodiments, the first device 110 may transmit, to the second device 120, an indication of the time window, together with some information used for the communication between the first device 110 and the second device 120. For example, the first device 110 may further transmit, to the second device 120, an indication for at least one of: at least one identity of at least one HARQ process, a mode of the HARQ ACK feedback within the time window, and availability of an attempt for the HARQ ACK feedback at a predetermined occasion on a Physical Sidelink Feedback Channel, PSFCH and so on. The at least one identity of at least one HARQ process may be used to explicitly indicate the association of the time window and the at least one HARQ process. Thus, the time window may be explicitly indicated to be associated with the at least one HARQ process with the at least one identity. Alternatively or in addition, the time window may be configured to be associated with the at least one HARQ process of current sidelink transmission as default where the time window is configured. In such example embodiments, the first device 110 may transmit indication of the time window in the at least one HARQ process to the second device 120, to implicitly indicate the association of the time window and the at least one HARQ process. Besides, the mode of the HARQ ACK feedback refers to whether the codebook-based feedback is enabled, which will be discussed in detail later with reference to FIG. 4. The availability of an attempt for the HARQ ACK feedback at a predetermined occasion on a Physical Sidelink Feedback Channel, PSFCH refers to whether the first device 110 needs to monitor HARQ ACK feedback at the predetermined occasion on FSFCH in advance.

In some example embodiments, the first device 110 may transmit the above indication to the second device 120 in the first stage or the second stage of SCI signalling when the first device 110 performs sidelink transmission with the second device 120. In some example embodiments, for unicast sidelink transmission initiated by the first device 110 to the second device 120, the above indication may be carried in the second stage of SCI signalling. In such example embodiments, there is no need for the first device 110 to indicate the identity of the second device 120. In some other example embodiments, for a groupcast sidelink transmission initiated by the first device to a plurality of devices including the second device 120, the above indication may be carried in the second stage of SCI signalling. Assuming that the identity of the second device 120 may be used to monitor the groupcast sidelink transmission, it is necessary for the device 110 to indicate the identity of the second device 120 in the SCI signalling. Alternatively or in addition, for a sidelink transmission initiated by the first device 110 to the second device 120 or another device, the above indication may be carried in the first stage of SCI signalling. For this, it's necessary for the first device 110 to indicate the identity of the second device 120 in the SCI signalling.

At block 330, the first device 110 monitors the HARQ ACK feedback from the second device 120 within the time window. In various example embodiments, the HARQ ACK feedback may be detected in some suitable way. In the example embodiments where the time window is positioned before the predetermined occasion, if the HARQ ACK feedback has not been detected for at least one HARQ process associated with the sidelink transmission, the first device 110 may monitor the HARQ ACK feedback from the second device 120 within the time window on the PSCCH/PSSCH/PSFCH. In other words, in such example embodiments, the first device 110 may blindly monitor the HARQ ACK feedback within the time window on the PSCCH/PSSCH/PSFCH. Thus, in some cases, the first device 110 may ignore the detection of the HARQ ACK feedback at the predetermined occasion on the PSFCH, for the reason that the HARQ ACK feedback may have been detected within the time window on the PSCCH/PSSCH/PSFCH. In such example embodiments, potential latency reduction may be obtained. In the example embodiments where the time window is positioned within the second time gap, the first device 110 may monitor the HARQ ACK feedback at the predetermined occasion on the PSFCH at first. Then, if the HARQ ACK feedback may not be detected, the first device 110 may monitor the HARQ ACK feedback within the time window on the PSCCH/PSSCH/PSFCH. In such example embodiments, transmission efficiency improvement may be achieved as an additional transmission opportunity for HARQ ACK feedback may be provided. In the example embodiments where the predetermined occasion is positioned within the time window, the first device 110 may monitor the HARQ ACK feedback within the time window on the PSCCH/PSSCH/PSFCH at first. Then, the first device 110 may monitor the HARQ ACK feedback at the predetermined occasion on the PSFCH, if the HARQ ACK feedback has not been detected within the time window on the PSCCH/PSSCH/PSFCH. Further, the first device 110 may continue to monitor the HARQ ACK feedback within the time window on the PSCCH/PSSCH/PSFCH if the HARQ ACK feedback may not be detected at the predetermined occasion on the PSFCH.

In some example embodiments, the first device 110 may monitor the HARQ ACK feedback from the second device within the time window in SCI signaling. For example, the HARQ ACK feedback may be transmitted to the first device 110 in the first stage or the second stage of SCI signaling. More details related will be discussed below with reference FIG. 4.

Figure 4:
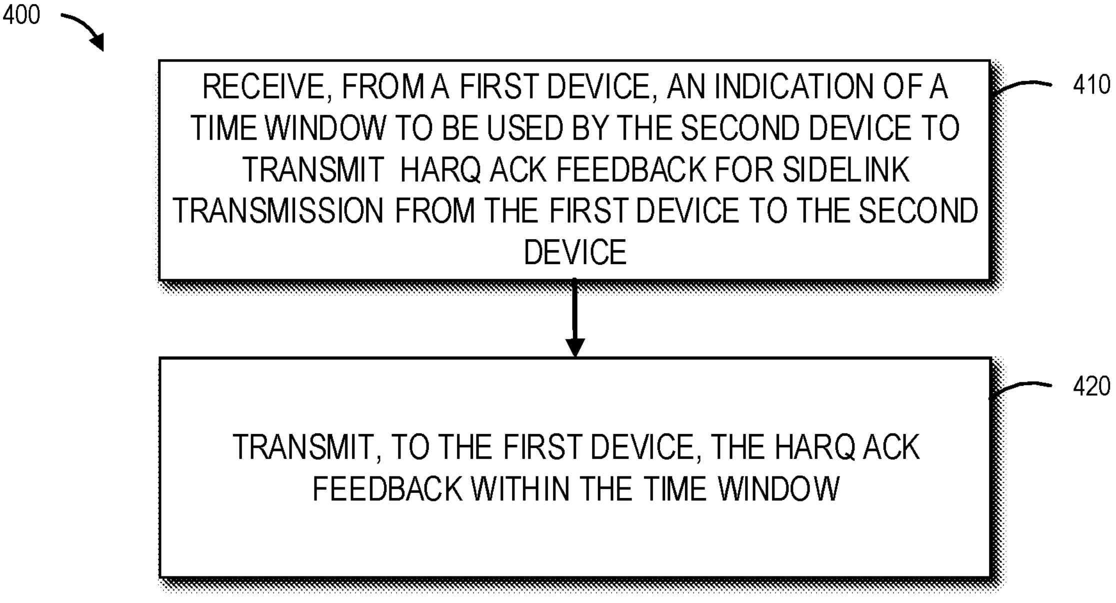
FIG. 4 shows a flowchart of an example method for the second device according to some example embodiments of the present disclosure.

FIG. 4 shows flowchart 400 of an example method for the second device 120 according to some example embodiments of the present disclosure. For the purpose of discussion, the method 400 will be described with reference to FIG. 1.

As shown in FIG. 4, at block 410, the second device 120 receives, from the first device 110, an indication of a time window to be used by the second device 120 to transmit HARQ ACK feedback for sidelink transmission from the first device 110 to the second device 120. The second device 120 may further receive, from the first device 110, an indication for at least one of: at least one identity of at least one HARQ process; a mode of the HARQ ACK feedback within the time window, and availability of an attempt for the HARQ ACK feedback at a predetermined occasion on a Physical Sidelink Feedback Channel, PSFCH, as discussed with reference to FIG. 3. In some example embodiments, the second device 120 may receive the indication from the first device 110 in the first stage or the second stage of SCI signalling, which has been discussed in detail with reference to FIG. 3.

The second device 120 may be configured to trigger the HARQ ACK feedback within the time window based on any suitable triggering approach. In the example embodiments where the time window is positioned within the second time gap, the second device 120 may be configured to trigger the HARQ ACK feedback within the time window if the HARQ ACK feedback may not be transmitted at the predetermined occasion on the PSFCH, for example, due to the failure of the LBT procedure. In the example embodiments where the time window is positioned before the predetermined occasion, the second device 120 may be configured to trigger the HARQ ACK feedback within the time window if the HARQ ACK feedback for at least one HARQ process associated with the sidelink transmission has not been transmitted. In the example embodiments where the predetermined occasion is positioned within the time window, the second device 120 may be configured to trigger the HARQ ACK feedback within the time window if the HARQ ACK feedback for at least one HARQ process has not been transmitted at first. Then, if the HARQ ACK feedback may not be transmitted at the predetermined occasion on the PSFCH, the second device 120 may continue to trigger the HARQ ACK feedback within the time window. The above triggering approaches may be predefined or configured by the device 110 to the second device 120. For example, the triggering approaches may be indicated to the second device 120 in SCI signalling. In some embodiments, the HARQ ACK feedback based on the time window may be (pre-)defined to be triggered at most once or multiple times.

According to the occurrence of one of the above triggering approaches, the second device 120 may reserve a resource for transmitting the HARQ ACK feedback within the time window. The reservation of the resource may be enabled in any suitable way. In some example embodiments, if there is no resource reserved for sidelink communication within the time window, the second device 120 may sense the channel and reserve dedicated resource within the time window as the resource for transmitting the HARQ ACK feedback. In some other embodiments the second device 120 may reuse the resource reserved for sidelink communication and available to the second device 120 within the time window as the resource for transmitting the HARQ ACK feedback, which may benefit resource overhead reduction, as the reservation of dedicated resource for the HARQ ACK feedback within the time window may be avoided. It can be seen that the control at the network side may not be needed, including the configuration of the time window used to transmit the HARQ-ACK feedback and resource allocation for the HARQ-ACK feedback, which benefits signalling overhead and latency reduction.

Still with reference to FIG. 4, at block 420, the second device 120 transmits, to the first device 110, the HARQ ACK feedback within the time window. The transmission of the HARQ ACK feedback may be enabled by the second device 120 on the reserved resource. The transmission of the HARQ ACK feedback within the time window may be enabled based on some suitable response condition. In the example embodiments where the time window is positioned before the predetermined occasion, the second device 120 may transmit, to the first device 110, the HARQ ACK feedback within the time window on the PSCCH,PSSCH or PSFCH before transmitting the HARQ ACK feedback at the predetermined occasion on the PSFCH. In such example embodiments, if the HARQ ACK feedback for at least one HARQ process associated with the sidelink transmission has not been transmitted, the second device 120 may transmit the HARQ ACK feedback to the first device 110 within the time window. In such example embodiments, latency reduction may be obtained. In the example embodiments where the time window is positioned within the second time gap, the second device 120 may transmit the HARQ ACK feedback to the first device 110 at the predetermined occasion on the PSFCH at first. Then, if the HARQ ACK feedback may not be transmitted at the predetermined occasion on the PSFCH, the second device 120 may transmit the HARQ ACK feedback to the first device within the time window on the PSCCH, PSSCH or PSFCH. In such example embodiments, potential transmission efficiency improvement may be obtained. In the example embodiments where the predetermined occasion is positioned within the time window, the second device 120 may transmit the HARQ ACK feedback to the first device within the time window on PSCCH, PSSCH or PSFCH at first. Then, if the HARQ ACK feedback for at least one HARQ process associated with the sidelink transmission has not been transmitted, the second device 120 may transmit the HARQ ACK feedback to the first device 110 at the predetermined occasion on the PSFCH. Further, if the HARQ ACK feedback may not be transmitted at the predetermined occasion on the PSFCH, the second device 120 may continue to transmit the HARQ ACK feedback to the first device within the time window on the PSCCH, PSSCH or PSFCH. In such example embodiments, more transmission opportunities may be provided and thus the transmission efficiency may be improved.

As stated above, the second device 120 may transmit the HARQ ACK feedback on the reserved resource. The HARQ ACK feedback initiated by the second device 120 on the reserved resource may be enabled in ay suitable way. In some example embodiments, the second device 120 may need to perform a LBT procedure before the HARQ ACK feedback. If the LBT procedure succeeds, the second device 120 may transmit the HARQ ACK feedback on the reserved resource. In some other embodiments the second device 120 may transmit the HARQ ACK feedback on the reserved resource without performing a LBT procedure.

In some example embodiments, the second device 210 may transmit, to the first device 110, the HARQ ACK feedback within the time window in the first stage or the second stage of SCI signaling. In some example embodiments, the HARQ ACK feedback may be transmitted by the second device 120 to the first device 110 in the first stage of SCI signalling. For this, the identity of the first device 110, together with the identity (ies) of the HARQ process(es) and the associated HARQ ACK feedback may be indicated in the SCI signalling. For example, a codebook may be used to indicate HARQ ACK feedback for all associated HARQ processes, where one-bit information in the codebook may be used to indicate a HARQ ACK feedback for an associated HARQ process. In some other embodiments the HARQ ACK feedback may be transmitted by the second device 120 to the first device 110 in the second stage of SCI signalling, which is scrambled with the identity of the first device 110. For this, the identity (ies) of HARQ process(es) and the associated HARQ ACK feedback may be indicated in the SCI signalling. For example, a codebook can be used to indicate HARQ ACK feedback for all associated HARQ processes, where one-bit information in the codebook may be used to indicate a HARQ ACK feedback for an associated HARQ process.

All operations and features as described above with reference to FIG. 3 are likewise applicable to the method 400 and have similar effects. For the purpose of simplification, the details will be omitted.

An example of HARQ ACK feedback for sidelink transmission between the first device 110 and the second device 120 will be discussed below with reference to FIG. 5. FIG. 5 shows a signalling flow 500 between the first device 110 and the second device 120 according to some example embodiments of the present disclosure. For the purpose of discussion, the signalling flow 500 will be described with reference to FIG. 1.

Figure 5:
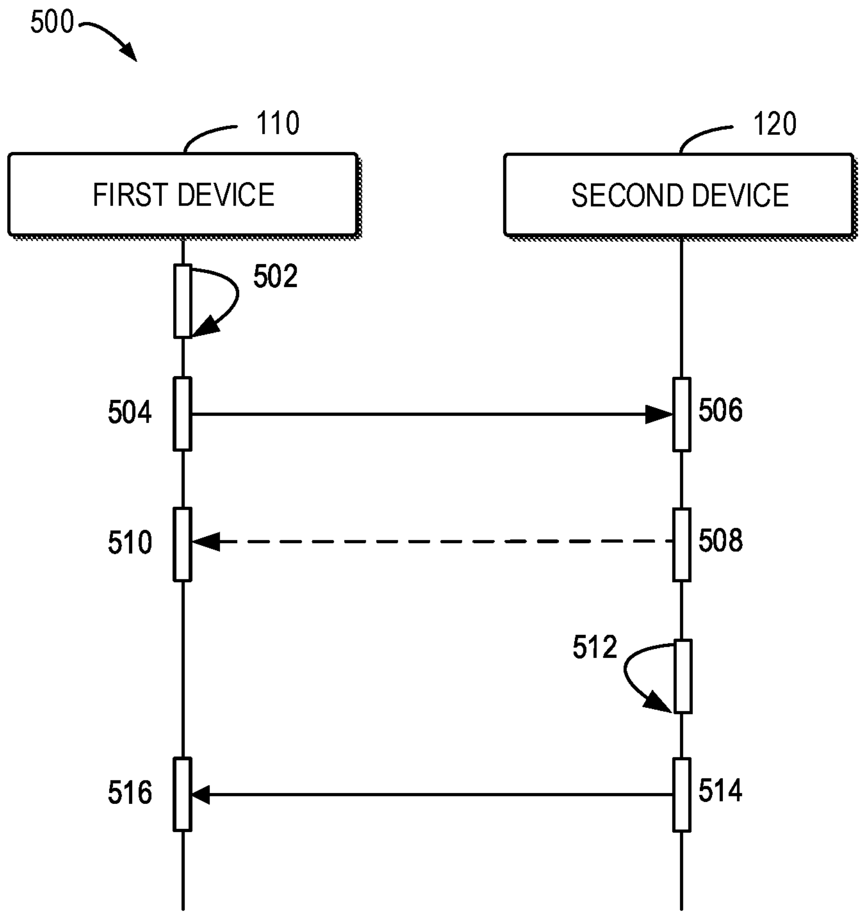
FIG. 5 shows a signalling flow between the first device and the second device according to some example embodiments of the present disclosure.

As shown in FIG. 5, the first device determines (502) a time window to be used by the second device 120 to transmit HARQ ACK feedback for sidelink transmission from the first device 110 to the second device 120. Then, the first device 110 transmits (504) an indication of the time window to the second device 120. Accordingly, the second device 120 receives (506) the indication of the time window from the first device 110. In some example embodiments, the second device 120 may transmit (508) the HARQ ACK feedback at a predetermined occasion on the PSFCH. Accordingly, the second device 120 may receive (510) the HARQ ACK feedback at the predetermined occasion on the PSFCH from the first device 110. However, the transmission of the HARQ ACK feedback at the predetermined occasion on the PSFCH may not be enabled due to, for example, the failure of the LBT procedure. In some other embodiments the second device 120 may reserve (512) a resource for transmitting the HARQ ACK feedback within the time window and transmit (514) the HARQ ACK feedback within the time on the reserved resource window to the first device 110. Accordingly, the first device 110 monitors (516) the HARQ ACK feedback from the second device 120. It can be seen that, the HARQ ACK feedback may be detected at the predetermined occasion on the PSFCH or within the time window on the PSCCH, PSSCH or PSFCH.

Those skilled in the art can understand that all operations and features as described above with reference to FIGS. 1-4 are likewise applicable to the signalling flow 500 and have similar effects.

Figure 6:
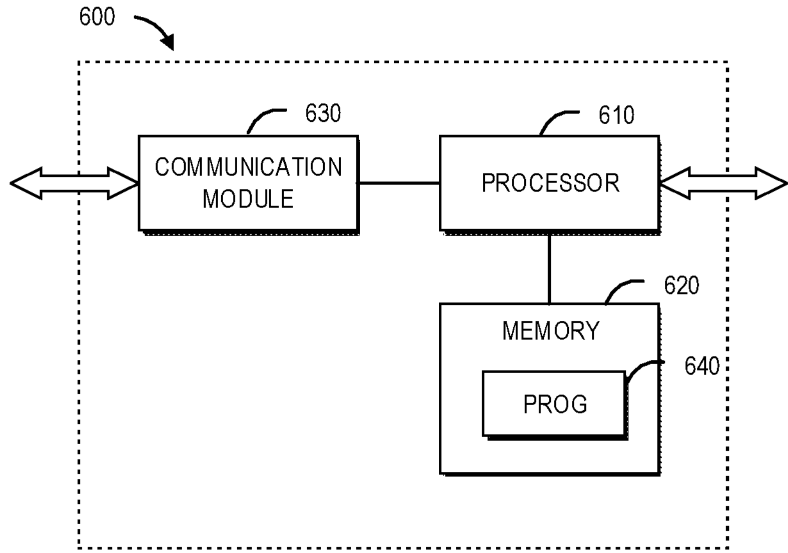
FIG. 6 shows a simplified block diagram of a device that is suitable for implementing example embodiments of the present disclosure.

FIG. 6 is a simplified block diagram of a device 600 that is suitable for implementing example embodiments of the present disclosure. The device 600 can be implemented at or as a part of the first device 110 or the second device 120 as shown in FIG. 1.

As shown, the device 600 includes a processor 610, a memory 620 coupled to the processor 610, a communication module 630 coupled to the processor 610, and a communication interface (not shown) coupled to the communication module 630. The memory 620 stores at least a program 640. The communication module 630 is for bidirectional communications, for example, via multiple antennas. The communication interface may represent any interface that is necessary for communication.

The program 640 is assumed to include program instructions that, when executed by the associated processor 610, enable the device 600 to operate in accordance with the example embodiments of the present disclosure, as discussed herein with reference to FIGS. 1-5. The example embodiments herein may be implemented by computer software executable by the processor 610 of the device 600, or by hardware, or by a combination of software and hardware. The processor 610 may be configured to implement various example embodiments of the present disclosure.

The memory 620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 620 is shown in the device 600, there may be several physically distinct memory modules in the device 600. The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

When the device 600 acts as the first device 110 or a part of the first device 110, the processor 610 and the communication module 630 may cooperate to implement the method 300 as described above with reference to FIGS. 1-3. When the device 600 acts as the first second 120 or a part of the second device 120, the processor 610 and the communication module 630 may cooperate to implement the method 400 as described above with reference to FIG. 4. All operations and features as described above with reference to FIGS. 1-5 are likewise applicable to the device 600 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 or 400 as described above with reference to FIGS. 1-4. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a first device comprises: at least one processor; and at least one memory including computer program code; the at least one memory and the computer program code configured to, with the at least one processor, cause the first device to: determine a time window to be used by a second device to transmit hybrid automatic repeat request acknowledgement, HARQ ACK, feedback for sidelink transmission from the first device to the second device; transmit an indication of the time window to the second device; and monitor the HARQ ACK feedback from the second device within the time window.

In some example embodiments, the first device is caused to monitor the HARQ ACK feedback from the second device within the time window by: monitoring the HARQ ACK feedback from the second device at a predetermined occasion on a Physical Sidelink Feedback Channel, PSFCH; and in response to the HARQ ACK feedback being undetected, monitoring the HARQ ACK feedback from the second device within the time window.

In some example embodiments, the first device is caused to monitor the HARQ ACK feedback from the second device within the time window by: in accordance with a determination that the HARQ ACK feedback is undetected for at least one HARQ process associated with the sidelink transmission, monitoring the HARQ ACK feedback from the second device within the time window.

In some example embodiments, the first device is caused to determine the time window by: in accordance with a determination that a first time gap between the sidelink transmission and reception of the HARQ ACK feedback at a predetermined occasion on a Physical Sidelink Feedback Channel, PSFCH, is above a threshold gap, determining the time window before the predetermined occasion for the reception of the HARQ ACK feedback on the PSFCH; or determining the time window within a second time gap between reception of the HARQ ACK feedback at a predetermined occasion on a Physical Sidelink Feedback Channel, PSFCH, and sidelink retransmission from the first device to the second device; and determining a size of the time window based on at least one of: the first time gap; the second time gap; and a latency requirement for the sidelink transmission.

In some example embodiments, the first device is caused to transmit the indication of the time window to the second device by: transmitting the indication of the time window to the second device in Sidelink Control Information, SCI, signalling.

In some example embodiments, the time window is associated with at least one HARQ process initiated by the first device for the unlicensed sidelink transmission.

In some example embodiments, the first device is further caused to: transmit, to the second device, an indication for at least one of: at least one identity of at least one HARQ process; a mode of the HARQ ACK feedback within the time window; and availability of an attempt for the HARQ ACK feedback at a predetermined occasion on a Physical Sidelink Feedback Channel, PSFCH.

In some example embodiments, the first device is caused to monitor the HARQ ACK feedback from the second device within the time window: in Sidelink Control Information, SCI, signalling, and/or on a Physical Sidelink Control Channel, PSCCH, a Physical Sidelink Shared Channel, PSSCH, and/or a Physical Sidelink Feedback Channel, PSFCH.

In some aspects, a second device comprises: at least one processor; and at least one memory including computer program code; the at least one memory and the computer program code configured to, with the at least one processor, cause the second device to: receive, from a first device, an indication of a time window to be used by the second device to transmit hybrid automatic repeat request acknowledgement, HARQ ACK, feedback for sidelink transmission from the first device to the second device; and transmit, to the first device, the HARQ ACK feedback within the time window.

In some example embodiments, the second device is further caused to: reserve a resource for transmitting the HARQ ACK feedback within the time window.

In some example embodiments, the second device is caused to reserve the resource for transmitting the HARQ ACK feedback within the time window by: reusing a resource reserved for sidelink communication and available to the second device within the time window as the resource for transmitting the HARQ ACK feedback.

In some example embodiments, the second device is caused to reserve the resource for transmitting the HARQ ACK feedback within the time window by: in response to absence of a resource reserved for sidelink communication within the time window, reserving a dedicated resource within the time window as the resource for transmitting the HARQ ACK feedback.

In some example embodiments, the second device is caused to transmit the HARQ ACK feedback to the first device by: in response to a failure of transmission of the HARQ ACK feedback at a predetermined occasion on a Physical Sidelink Feedback Channel, PSFCH, transmitting the HARQ ACK feedback to the first device within the time window.

In some example embodiments, the second device is caused to transmit the HARQ ACK feedback to the first device by: in response to a failure of transmission of the HARQ ACK feedback for at least one HARQ process associated with the sidelink transmission, transmitting the HARQ ACK feedback to the first device within the time window.

In some example embodiments, the second device is caused to receive the indication of the time window from the first device by: receiving, from the first device, the indication of the time window in Sidelink Control Information, SCI, signalling.

In some example embodiments, the time window is associated with at least one HARQ process initiated by the first device for the unlicensed sidelink transmission.

In some example embodiments, the second device is further caused to: receive, from the second device. an indication for at least one of: at least one identity of at least one HARQ process; a mode of the HARQ ACK feedback within the time window and availability of an attempt for the HARQ ACK feedback at a predetermined occasion on a Physical Sidelink Feedback Channel, PSFCH.

In some example embodiments, the second device is caused to transmit the HARQ ACK feedback: in Sidelink Control Information, SCI, signalling, and/or on a Physical Sidelink Control Channel, PSCCH, a Physical Sidelink Shared Channel, PSSCH, and/or a Physical Sidelink Feedback Channel, PSFCH.

In some aspects, a method implemented at a first device comprises: determining a time window to be used by a second device to transmit hybrid automatic repeat request acknowledgement, HARQ ACK, feedback for sidelink transmission from the first device to the second device; transmitting an indication of the time window to the second device; and monitoring the HARQ ACK feedback from the second device within the time window.

In some example embodiments, monitoring the HARQ ACK feedback from the second device within the time window comprises: monitoring the HARQ ACK feedback from the second device at a predetermined occasion on a Physical Sidelink Feedback Channel, PSFCH; and in response to the HARQ ACK feedback being undetected, monitoring the HARQ ACK feedback from the second device within the time window.

In some example embodiments, monitoring the HARQ ACK feedback from the second device within the time window comprises: in accordance with a determination that the HARQ ACK feedback is undetected for at least one HARQ process associated with the sidelink transmission, monitoring the HARQ ACK feedback from the second device within the time window.

In some example embodiments, determining the time window comprises: in accordance with a determination that a first time gap between the sidelink transmission and reception of the HARQ ACK feedback at a predetermined occasion on a Physical Sidelink Feedback Channel, PSFCH, is above a threshold gap, determining the time window before the predetermined occasion for the reception of the HARQ ACK feedback on the PSFCH; or determining the time window within a second time gap between reception of the HARQ ACK feedback at a predetermined occasion on a Physical Sidelink Feedback Channel, PSFCH, and sidelink retransmission from the first device to the second device; and determining a size of the time window based on at least one of: the first time gap; the second time gap; and a latency requirement for the sidelink transmission.

In some example embodiments, transmitting the indication of the time window to the second device comprises: transmitting the indication of the time window to the second device in Sidelink Control Information, SCI, signalling.

In some example embodiments, the time window is associated with at least one HARQ process initiated by the first device for the unlicensed sidelink transmission.

In some example embodiments, the method further comprises: transmitting, to the second device, an indication for at least one of: at least one identity of at least one HARQ process; a mode of the HARQ ACK feedback within the time window; and availability of an attempt for the HARQ ACK feedback at a predetermined occasion on a Physical Sidelink Feedback Channel, PSFCH.

In some example embodiments, the HARQ ACK feedback from the second device is monitored within the time window: in Sidelink Control Information, SCI, signalling, and/or on a Physical Sidelink Control Channel, PSCCH, a Physical Sidelink Shared Channel, PSSCH, and/or a Physical Sidelink Feedback Channel, PSFCH.

In some aspects, a method implemented at a second device comprises: receiving, from a first device, an indication of a time window to be used by the second device to transmit hybrid automatic repeat request acknowledgement, HARQ ACK, feedback for sidelink transmission from the first device to the second device; and transmitting, to the first device, the HARQ ACK feedback within the time window.

In some example embodiments, the method further comprises: reserving a resource for transmitting the HARQ ACK feedback within the time window.

In some example embodiments, reserving the resource for transmitting the HARQ ACK feedback within the time window comprises: reusing a resource reserved for sidelink communication and available to the second device within the time window as the resource for transmitting the HARQ ACK feedback.

In some example embodiments, reserving the resource for transmitting the HARQ ACK feedback within the time window comprises: in response to absence of a resource reserved for sidelink communication within the time window, reserving a dedicated resource within the time window as the resource for transmitting the HARQ ACK feedback.

In some example embodiments, transmitting the HARQ ACK feedback to the first device comprises: in response to a failure of transmission of the HARQ ACK feedback at a predetermined occasion on a Physical Sidelink Feedback Channel, PSFCH, transmitting the HARQ ACK feedback to the first device within the time window.

In some example embodiments, transmitting the HARQ ACK feedback to the first device comprises: in response to a failure of transmission of the HARQ ACK feedback for at least one HARQ process associated with the sidelink transmission, transmitting the HARQ ACK feedback to the first device within the time window.

In some example embodiments, receiving the indication of the time window comprises: receiving, from the first device, the indication of the time window in Sidelink Control Information, SCI, signalling.

In some example embodiments, the time window is associated with at least one HARQ process initiated by the first device for the unlicensed sidelink transmission.

In some example embodiments, the method further comprises: receiving, from the second device, an indication for at least one of: at least one identity of at least one HARQ process; a mode of the HARQ ACK feedback within the time window; and availability of an attempt for the HARQ ACK feedback at a predetermined occasion on a Physical Sidelink Feedback Channel, PSFCH.

In some example embodiments, the HARQ ACK feedback is transmitted: in Sidelink Control Information, SCI, signalling, and/or on a Physical Sidelink Control Channel, PSCCH, a Physical Sidelink Shared Channel, PSSCH, and/or a Physical Sidelink Feedback Channel, PSFCH.

In some aspects, an apparatus comprises: means for determining a time window to be used by a second device to transmit hybrid automatic repeat request acknowledgement, HARQ ACK, feedback for sidelink transmission from the first device to the second device; means for transmitting an indication of the time window to the second device; and means for monitoring the HARQ ACK feedback from the second device within the time window.

In some example embodiments, the means for monitoring the HARQ ACK feedback from the second device within the time window comprises: means for monitoring the HARQ ACK feedback from the second device at a predetermined occasion on a Physical Sidelink Feedback Channel, PSFCH; and means for in response to the HARQ ACK feedback being undetected, monitoring the HARQ ACK feedback from the second device within the time window.

In some example embodiments, the means for monitoring the HARQ ACK feedback from the second device within the time window comprises: means for in accordance with a determination that the HARQ ACK feedback is undetected for at least one HARQ process associated with the sidelink transmission, monitoring the HARQ ACK feedback from the second device within the time window.

In some example embodiments, the means for determining the time window comprises: means for in accordance with a determination that a first time gap between the sidelink transmission and reception of the HARQ ACK feedback at a predetermined occasion on a Physical Sidelink Feedback Channel, PSFCH, is above a threshold gap, determining the time window before the predetermined occasion for the reception of the HARQ ACK feedback on the PSFCH, means for determining the time window within a second time gap between reception of the HARQ ACK feedback at a predetermined occasion on a Physical Sidelink Feedback Channel, PSFCH, and sidelink retransmission from the first device to the second device, and means for determining a size of the time window based on at least one of: the first time gap; the second time gap; and a latency requirement for the sidelink transmission.

In some example embodiments, the means for transmitting the indication of the time window to the second device comprises: means for transmitting the indication of the time window to the second device in Sidelink Control Information, SCI, signalling.

In some example embodiments, the time window is associated with at least one HARQ process initiated by the first device for the unlicensed sidelink transmission.

In some example embodiments, the apparatus further comprises: means for transmitting, to the second device, an indication for at least one of: at least one identity of at least one HARQ process; a mode of the HARQ ACK feedback within the time window; and availability of an attempt for the HARQ ACK feedback at a predetermined occasion on a Physical Sidelink Feedback Channel, PSFCH.

In some example embodiments, the HARQ ACK feedback from the second device is monitored within the time window: in Sidelink Control Information, SCI, signalling, and/or on a Physical Sidelink Control Channel, PSCCH, a Physical Sidelink Shared Channel, PSSCH, and/or a Physical Sidelink Feedback Channel, PSFCH.

In some aspects, an apparatus comprises: means for receiving, from a first device, an indication of a time window to be used by the second device to transmit hybrid automatic repeat request acknowledgement, HARQ ACK, feedback for sidelink transmission from the first device to the second device; and means for transmitting, to the first device, the HARQ ACK feedback within the time window.

In some example embodiments, the apparatus further comprises: means for reserving a resource for transmitting the HARQ ACK feedback within the time window.

In some example embodiments, the means for reserving the resource for transmitting the HARQ ACK feedback within the time window comprises: means for reusing a resource reserved for sidelink communication and available to the second device within the time window as the resource for transmitting the HARQ ACK feedback.

In some example embodiments, the means for reserving the resource for transmitting the HARQ ACK feedback within the time window comprises: means for in response to absence of a resource reserved for sidelink communication within the time window, reserving a dedicated resource within the time window as the resource for transmitting the HARQ ACK feedback.

In some example embodiments, the means for transmitting the HARQ ACK feedback to the first device comprises: means for in response to a failure of transmission of the HARQ ACK feedback at a predetermined occasion on a Physical Sidelink Feedback Channel, PSFCH, transmitting the HARQ ACK feedback to the first device within the time window.

In some example embodiments, the means for transmitting the HARQ ACK feedback to the first device comprises: means for in response to a failure of transmission of the HARQ ACK feedback for at least one HARQ process associated with the sidelink transmission, transmitting the HARQ ACK feedback to the first device within the time window.

In some example embodiments, the means for receiving the indication of the time window from the first device comprises: means for receiving, from the first device, the indication of the time window in Sidelink Control Information, SCI, signalling.

In some example embodiments, the time window is associated with at least one HARQ process initiated by the first device for the unlicensed sidelink transmission.

In some example embodiments, the apparatus further comprises: means for receiving, from the second device, an indication for at least one of: at least one identity of at least one HARQ process; a mode of the HARQ ACK feedback within the time window, or availability of an attempt for the HARQ ACK feedback at a predetermined occasion on a Physical Sidelink Feedback Channel, PSFCH.

In some example embodiments, the HARQ ACK feedback is transmitted: in Sidelink Control Information, SCI, signalling, and/or on a Physical Sidelink Control Channel, PSCCH, a Physical Sidelink Shared Channel, PSSCH, and/or a Physical Sidelink Feedback Channel, PSFCH.

In some aspects, a computer readable storage medium comprises program instructions stored thereon, the instructions, when executed by a processor of a device, causing the device to perform the method according to some example embodiments of the present disclosure.

What is claimed is:

1. A first device, comprising:

at least one processor; and at least one memory including computer program code;

the at least one memory and the computer program code configured to, with the at least one processor, cause the first device to:

determine a time window to be used by a second device to transmit hybrid automatic repeat request acknowledgement, HARQ ACK, feedback for sidelink transmission from the first device to the second device;

transmit an indication of the time window to the second device; and monitor the HARQ ACK feedback from the second device within the time window by: in accordance with a determination that the HARQ ACK feedback is undetected for at least one HARQ process associated with the sidelink transmission, monitor the HARQ ACK feedback from the second device within the time window.

2. The first device of claim 1, wherein the first device is caused to monitor the HARQ ACK feedback from the second device within the time window by:

monitoring the HARQ ACK feedback from the second device at a predetermined occasion on a Physical Sidelink Feedback Channel, PSFCH; and in response to the HARQ ACK feedback being undetected, monitoring the HARQ ACK feedback from the second device within the time window.

3. The first device of claim 1, wherein the first device is caused to determine the time window by:

in accordance with a determination that a first time gap between the sidelink transmission and reception of the HARQ ACK feedback at a predetermined occasion on a Physical Sidelink Feedback Channel, PSFCH, is above a threshold gap, determining the time window before the predetermined occasion for the reception of the HARQ ACK feedback on the PSFCH; or determining the time window within a second time gap between reception of the HARQ ACK feedback at a predetermined occasion on a Physical Sidelink Feedback Channel, PSFCH, and sidelink retransmission from the first device to the second device; and determining a size of the time window based on at least one of:

the first time gap;

the second time gap; and a latency requirement for the sidelink transmission.

4. The first device of claim 1, wherein the first device is caused to transmit the indication of the time window to the second device by:

transmitting the indication of the time window to the second device in Sidelink Control Information, SCI, signalling.

5. The first device of claim 1, wherein the first device is further caused to:

transmit, to the second device, an indication for at least one of:

at least one identity of at least one HARQ process;

a mode of the HARQ ACK feedback within the time window; and availability of an attempt for the HARQ ACK feedback at a predetermined occasion on a Physical Sidelink Feedback Channel, PSFCH.

6. The first device of claim 1, wherein the first device is caused to monitor the HARQ ACK feedback from the second device within the time window:

in Sidelink Control Information, SCI, signalling, and/or on a Physical Sidelink Control Channel, PSCCH, a Physical Sidelink Shared Channel, PSSCH, and/or a Physical Sidelink Feedback Channel, PSFCH.

7. A second device, comprising:

at least one processor; and at least one memory including computer program code;

the at least one memory and the computer program code configured to, with the at least one processor, cause the second device to:

receive, from a first device, an indication of a time window to be used by the second device to transmit hybrid automatic repeat request acknowledgement, HARQ ACK, feedback for sidelink transmission from the first device to the second device; and transmit, to the first device, the HARQ ACK feedback within the time window, wherein the second device is caused to transmit the HARQ ACK feedback to the first device by: in response to a failure of transmission of the HARQ ACK feedback at a predetermined occasion on a Physical Sidelink Feedback Channel, PSFCH, transmitting the HARQ ACK feedback to the first device within the time window.

8. The second device of claim 7, wherein the second device is caused to transmit the HARQ ACK feedback to the first device by:

in response to a failure of transmission of the HARQ ACK feedback for at least one HARQ process associated with the sidelink transmission, transmitting the HARQ ACK feedback to the first device within the time window.

9. The second device of claim 7, wherein the second device is caused to receive the indication of the time window from the first device by:

receiving, from the first device, the indication of the time window in Sidelink Control Information, SCI, signalling.

10. The second device of claim 7, wherein the second device is further caused to:

receive, from the first device, an indication for at least one of:

at least one identity of at least one HARQ process;

a mode of the HARQ ACK feedback within the time window; and availability of an attempt for the HARQ ACK feedback at a predetermined occasion on a Physical Sidelink Feedback Channel, PSFCH.

11. The second device of claim 7, wherein the second device is caused to transmit the HARQ ACK feedback:

in Sidelink Control Information, SCI, signalling, and/or on a Physical Sidelink Control Channel, PSCCH, a Physical Sidelink Shared Channel, PSSCH, and/or a Physical Sidelink Feedback Channel, PSFCH.

12. A method, comprising:

receiving, from a first device, an indication of a time window to be used by the second device to transmit hybrid automatic repeat request acknowledgement, HARQ ACK, feedback for sidelink transmission from the first device to the second device; and transmitting, to the first device, the HARQ ACK feedback within the time window, wherein transmitting the HARQ ACK feedback to the first device comprises: in response to a failure of transmission of the HARQ ACK feedback at a predetermined occasion on a Physical Sidelink Feedback Channel, PSFCH, transmitting the HARQ ACK feedback to the first device within the time window.

13. The method of claim 12, wherein transmitting the HARQ ACK feedback to the first device comprises:

in response to a failure of transmission of the HARQ ACK feedback for at least one HARQ process associated with the sidelink transmission, transmitting the HARQ ACK feedback to the first device within the time window.

14. The method of claim 12, wherein receiving the indication of the time window comprises: receiving, from the first device, the indication of the time window in Sidelink Control Information, SCI, signalling.

15. The method of claim 12, further comprising:

receiving, from the first device, an indication for at least one of:

at least one identity of at least one HARQ process;

a mode of the HARQ ACK feedback within the time window; and availability of an attempt for the HARQ ACK feedback at a predetermined occasion on a Physical Sidelink Feedback Channel, PSFCH.

16. The method of claim 12, wherein the HARQ ACK feedback is transmitted:

in Sidelink Control Information, SCI, signalling, and/or on a Physical Sidelink Control Channel, PSCCH, a Physical Sidelink Shared Channel, PSSCH, and/or a Physical Sidelink Feedback Channel, PSFCH.

* * * * *